UNITED STATES PATENT OFFICE.

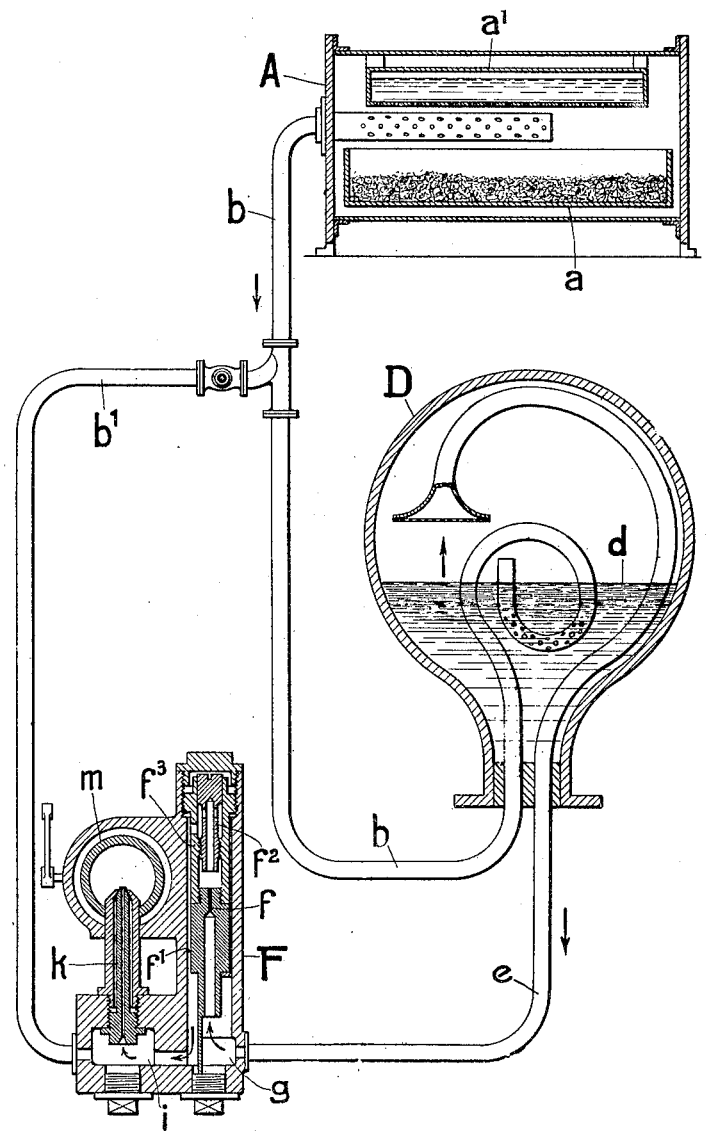

JACOB SIEBER, OF OLTEN, SWITZERLAND.

APPARATUS FOR OPERATING INTERNAL-COMBUSTION ENGINES BY MEANS OF ACETYLENE.

1,376,786.   Specification of Letters Patent.   Patented May 3, 1921.

Application filed April 4, 1919. Serial No. 287,586.

*To all whom it may concern:*

Be it known that I, JACOB SIEBER, a citizen of the Republic of Switzerland, and resident of Olten, Switzerland, have invented a new and useful Apparatus for Operating Internal-Combustion Engines by Means of Acetylene, of which the following is a full, clear, and exact specification.

This invention relates to an apparatus for operating internal combustion engines by means of acetylene.

This apparatus comprises an acetylene generator, a vessel containing a bath of ammonia connected with the generator, for purifying and impregnating acetylene, and an apparatus connected with the engine and having a narrow central duct and a narrow annular duct through which successively the acetylene laden with particles of liquid derived from the bath travels in thin layers by a comparatively long path and in which it is preheated by the heat of the engine, any entrained particles of liquid being evaporated; the channels terminate in a nozzle through which the acetylene is sucked into the engine.

The accompanying diagrammatic drawing illustrates an apparatus suitable for applying the process.

A is an acetylene generator on a motor car, ship or the like, $a$ being the carbid container and $a'$ the water vessel. The acetylene leaves the generator through pipe $b$ which extends into a closed vessel D containing an ammonia-bath $d$. The bath may advantageously be an aqueous solution of ammonia to which a small proportion of ether and camphor has been added; for example for 10 parts of the whole ammonia-bath 1 part of ether and 1 part of camphor to partly purify the gas and partly impregnate the same with particles of liquid enriching the fuel in view of its subsequent explosive action. After passing through this bath the gas, purified and carrying particles of liquid, travels through pipe $e$ to the apparatus F which is connected directly with an internal combustion engine. This apparatus has a narrow central duct $f$ and a narrow annular duct $f'$ which communicate with each other at their upper end through hollow pieces $f^2$, $f^3$ having lateral perforations, so that the purified acetylene, carrying drops of water and entering at $g$ from the ammonia-bath, travels upward through the central duct $f$ and downward through the annular duct $f'$. In the course of this comparatively long passage the acetylene is exposed in a thin layer to the heat of the engine which travels by conduction from the latter, whereby the acetylene is preheated and particles of liquid in it may be evaporated. Moreover, the narrow passages $f$, $f'$ form a satisfactory insurance against flashing back. From the duct $f'$ the acetylene passes into the chamber $i$, whence it is drawn through the suction nozzle $k$ into the air intake nozzle $m$ which is open at one end and connected with the engine at the other, in this nozzle the explosive mixture is formed.

A branch $b'$ leading directly from the pipe $b$ to the chamber $i$ and controlled by a valve, makes it possible to conduct acetylene directly to the nozzle $k$ for starting the engine.

What I claim is:

1. Apparatus for operating internal combustion engines by means of acetylene, comprising an acetylene generator, a vessel connected therewith and containing an ammonia-bath for purifying and impregnating acetylene, an apparatus connected with the engine having a narrow central duct and a narrow annular duct in which successively the acetylene laden with particles of liquid passes from the bath in a thin layer along a comparatively lengthy path and is exposed to the heat of the engine for preheating the acetylene and evaporating the liquid particles which it carries, and a suction nozzle into which the said channels open and which opens into an air intake, substantially as described.

2. Apparatus for operating internal combustion engines by means of acetylene, comprising an acetylene generator, a vessel connected therewith and containing an ammonia-bath for purifying and impregnating acetylene, an apparatus connected with the engine having a narrow central duct and a narrow annular duct in which successively the acetylene laden with particles of liquid passes from the bath in a thin layer along a comparatively lengthy path and is exposed to the heat of the engine for preheating the acetylene and evaporating the liquid particles which it carries, and a suction nozzle into which the said ducts open and which opens into an air intake, a pipe controlled by a valve and forming a direct communication between the acetylene generator and the suction nozzle being provided for the purpose of starting the engine, substantially as described.

In witness whereof I have hereunto signed my name this 25th day of July, 1918, in the presence of two subscribing witnesses.

JACOB SIEBER.

Witnesses:
H. H. DICK,
AMAND BRAUN.